US006474901B1

(12) United States Patent
Thurston

(10) Patent No.: US 6,474,901 B1
(45) Date of Patent: Nov. 5, 2002

(54) MODULAR DOVETAIL JOINT

(76) Inventor: Lee Thurston, 13420 Woodrose Way, Grass Valley, CA (US) 95945

( * ) Notice: Subject to any disclaimer, the term of this patent is extended or adjusted under 35 U.S.C. 154(b) by 0 days.

(21) Appl. No.: 09/474,054

(22) Filed: Dec. 28, 1999

(51) Int. Cl.[7] .................................................. F16B 9/02
(52) U.S. Cl. ............................... 403/381; 403/DIG. 13; 403/382; 403/403
(58) Field of Search ................................. 403/231, 233, 403/381, 403, DIG. 11; 312/348.4, 265.5

(56) References Cited

U.S. PATENT DOCUMENTS

| 501,564 | A | * | 7/1893 | Goodyear | .................... | 403/403 |
|---|---|---|---|---|---|---|
| 2,518,557 | A | | 8/1950 | Krantz | | |
| 2,793,407 | A | | 5/1957 | Johnston | | |
| 3,090,086 | A | | 5/1963 | Fata | | |
| 3,944,377 | A | * | 3/1976 | Defrese | ........... | 403/DIG. 11 X |
| 3,999,878 | A | | 12/1976 | Robinson | | |
| 4,279,455 | A | | 7/1981 | Santo | | |
| 4,507,815 | A | * | 4/1985 | Danko | ........................ | 403/403 |
| 4,867,598 | A | | 9/1989 | Winter | | |
| 4,973,187 | A | * | 11/1990 | Sauder | .................... | 403/231 X |
| 5,180,250 | A | | 1/1993 | Ferro | | |
| 5,244,300 | A | | 9/1993 | Perreira et al. | | |
| 5,577,856 | A | * | 11/1996 | Tezuka | .................... | 403/381 X |
| 5,588,726 | A | * | 12/1996 | Lee | ......................... | 403/381 X |
| 5,641,240 | A | | 6/1997 | Grieser et al. | | |
| 5,860,759 | A | | 1/1999 | Leicht | | |
| 5,893,617 | A | * | 4/1999 | Lee | ......................... | 403/381 X |
| 6,124,015 | A | * | 9/2000 | Baker et al. | .................... | 428/99 |
| 6,179,515 | B1 | * | 1/2001 | Griesser et al. | .......... | 403/381 X |
| 6,192,645 | B1 | * | 2/2001 | Benz et al. | .............. | 403/231 X |
| 6,200,062 | B1 | * | 3/2001 | You | ............................ | 403/381 |
| 6,325,596 | B1 | * | 12/2001 | Tomko | .................... | 415/209.2 |

* cited by examiner

Primary Examiner—Lynne H. Browne
Assistant Examiner—Ernesto Garcia
(74) Attorney, Agent, or Firm—John P. Costello; Weintraub Genshlea Chediak Sproul

(57) ABSTRACT

A modular dovetail joint bracket includes a planar first flange, a planar second flange at a right angle to the first, and a dovetail-shaped tenon projecting from the second flange, adjacent the outer apex of the first and second flanges. The tenon has slots along one of its tapered faces. An alternative embodiment of the bracket has a truncated second flange.

1 Claim, 8 Drawing Sheets

MODULAR DOVETAIL JOINT

BACKGROUND OF THE INVENTION

1. Field of the Invention

The present invention relates generally to fastening devices for joining structural members, and more specifically to mortise and tenon joint constructions in furniture manufacture.

2. Description of the Related Art

In the art of wooden furniture making, the dovetail joint is one of the most popular and secure mortise and tenon-type joints. However, it requires great care in preparation, as there is a significant incidence of product failure due to splitting wood and other such material faults. Further, any imprecision in the cutting or assembly of the mortise groove and tenon of a dovetail joint can affect the geometry of the furniture piece.

The precision problem is best illustrated in the context of one common method of constructing a drawer, wherein vertically-oriented mortise grooves are cut into the inner face of the drawer front, near its left and right side ends. These mortise grooves slidingly receive dovetail-shaped forward ends of the drawer's left and right side panels. That is, the entire forward edge of each drawer side panel, from top to bottom, is shaped as a mating dovetail tenon. Thus, in horizontal cross-section, each tenon is essentially an isosceles trapezoid projecting, at its shorter base, from the end edge of a drawer side panel. And, each receiving mortise groove has a complementary shape.

This sliding dovetail joint, if manufactured with sufficient precision, is very easy to assemble, and it results in a tight, strong, durable, aesthetically-acceptable product. It is for these reasons that furniture manufacturers are very attracted to this type of drawer construction. It is for these same reasons that manufacturers of furniture designed to be user-assembled, called "RTA" (ready-to-assemble) furniture, have long sought a workable dovetail joint for use in their furniture kits. However, variations in the depth of the mortise cut, caused by differences in thickness among individual pieces of drawer-front panel stock, provoke continual problems with the mortise and tenon fit. For example, using the outer face of the drawer-front panel as the reference surface, if a thicker than usual piece of stock is run through a router to cut the mortise grooves, the grooves will be deeper than usual. Conversely, thinner pieces of stock will end up having shallower mortise grooves. It is not unusual for drawer-front stock to vary up to ⅟16 of an inch in thickness, causing a corresponding variation in mortise groove depth. This results in some mortise grooves grasping the more standardly-shaped tenons differently than others. This, in turn, results occasionally in loose joints and out-of-square construction. In custom furniture manufacturing, these problems can be cured by planing each piece of panel stock to the exact same thickness, or by making a custom-shaped tenon for each joint. However, RTA furniture makers do not have the luxury of taking that time. Thus, defective parts result. If not caught and discarded at the factory causing an immediate loss of revenue, these end up in the hands of end-users, breeding customer dissatisfaction. It is for these reasons the RTA furniture industry has yet to be able to enjoy the benefits of dovetail joinery.

Thus, it appears that some inexpensive, reliable means for forming a precise, durable sliding dovetail joint is needed. And, it would be especially beneficial if such a dovetail joint could be easily incorporated into RTA furniture constructions.

SUMMARY OF THE INVENTION

The modular dovetail joint of the present invention is adapted to overcome the above-noted shortcomings and to fulfill the stated needs. In its broadest sense, the invention is a joint bracket comprising: means for securely engaging an area adjacent an edge of a first structural member; and, means adapted for engaging a mortise groove in a second structural member, wherein the mortise groove-engaging means is integral with the first structural member's edge-adjacent area engaging means. More specifically, the joint bracket of the invention comprises: a planar first flange; a planar second flange integral with, and disposed at less than a 180-degree angle to, the first flange; and, a tenon projecting from an outer surface of the second flange.

It is an object of the present invention to provide means for permitting RTA furniture manufacturers to get the benefits of using sliding dovetail joint construction, without the problems of material failure and imprecision which arise in using standard techniques.

It is a further object of the present invention to provide a joint structure for user-assembled furniture which is easy to assemble, yet as tight, strong, precise and secure as a custom-made dovetail joint.

Yet another object of the invention is to provide means for providing RTA furniture able to be shipped flat, and to be assembled with a mere screwdriver by an unskilled end user.

Still further objects of the inventive modular dovetail joint disclosed herein will be apparent from the drawings and following detailed description thereof.

DESCRIPTION OF THE PREFERRED EMBODIMENT

Figure 1:
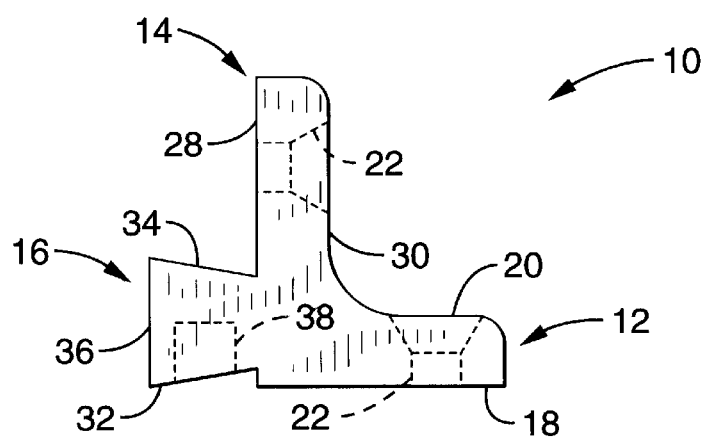
FIG. 1 is an end elevation of the modular dovetail bracket of the invention.

Referring now specifically to the drawings, FIGS. 1 through 6 show the inventive modular dovetail bracket, which is generally identified herein with the reference numeral 10. Modular dovetail bracket 10 is comprised of a first planar flange 12; a second planar flange 14 at right-angles to first flange 12; and, a dovetail-shaped tenon 16 projecting from adjacent the outer apex of flanges 12 and 14. Modular dovetail bracket 10 is preferably molded from a single, integral piece of dense plastic.

First flange 12 is generally rectangular and of uniform thickness. It includes first panel-contacting face 18, and first fastener head-receiving face 20. Apertures 22 for screws 24, or other fasteners, pass through first flange 12. Screw heads 26 seat on the fastener head-receiving face side of first flange 12.

Second flange 14 is also generally rectangular and of uniform thickness. Second flange 14 is integrally-connected to first flange 12, and includes second panel-contacting face 28, and second fastener head-receiving face 30. Apertures 22 for screws 24, or other fasteners, pass through second flange 14. Screw heads 26 seat on the fastener head-receiving face side of second flange 14.

Tenon 16 projects generally perpendicularly from second panel-contacting face 28. In cross-section, tenon 16 is shaped generally an isosceles trapezoid, although it is actually integral with second flange 14, having what would be the trapezoid's shorter parallel base defined by the plane of second panel-contacting face 28. As best shown in FIG. 1, tenon 16 projects from second flange 14's second panel-contacting face 28 in a direction parallel to, but slightly offset from, the plane of first flange 12.

First and second tapered faces 32 and 34 of tenon 16 are at opposing, roughly 80-degree angles to second panel-contacting face 28, i.e. 10 degrees away from the central plane of tenon 16, as shown in the drawing figures. Distal face 36 of tenon 16 lies in a plane parallel with second panel-contacting face 28. Thus, tenon 16 has generally the same shape as the tenon in a conventional dovetail joint.

Figure 2:
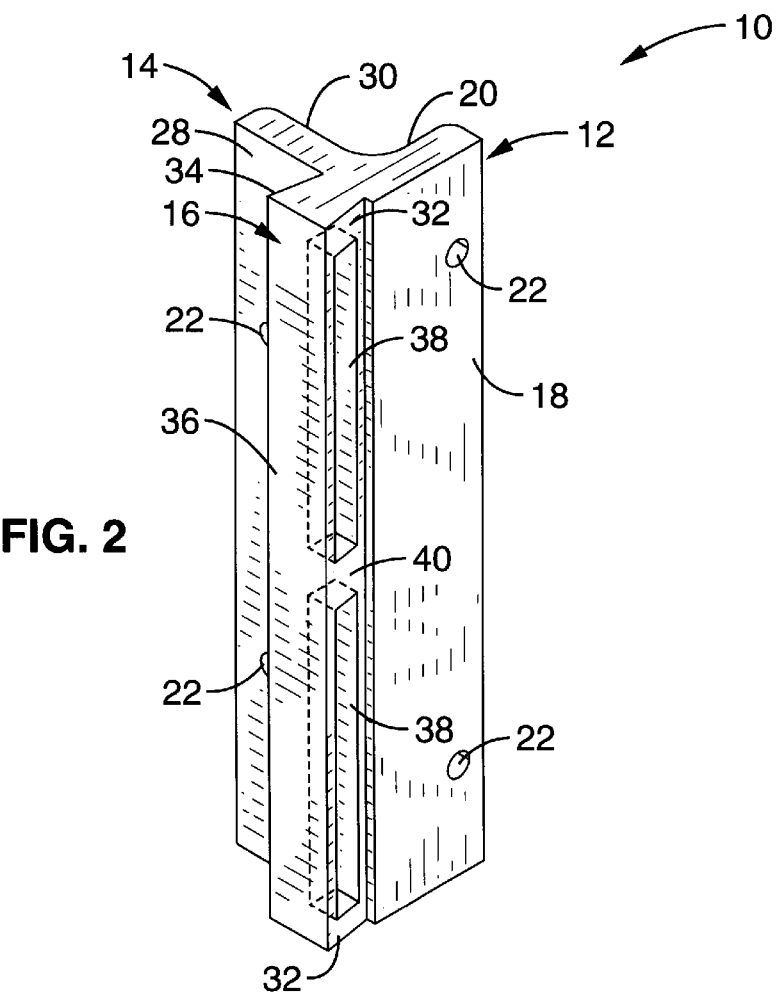
FIG. 2 is a perspective view of the panel-engaging flange-face of the modular dovetail bracket of the invention.
Figure 3:
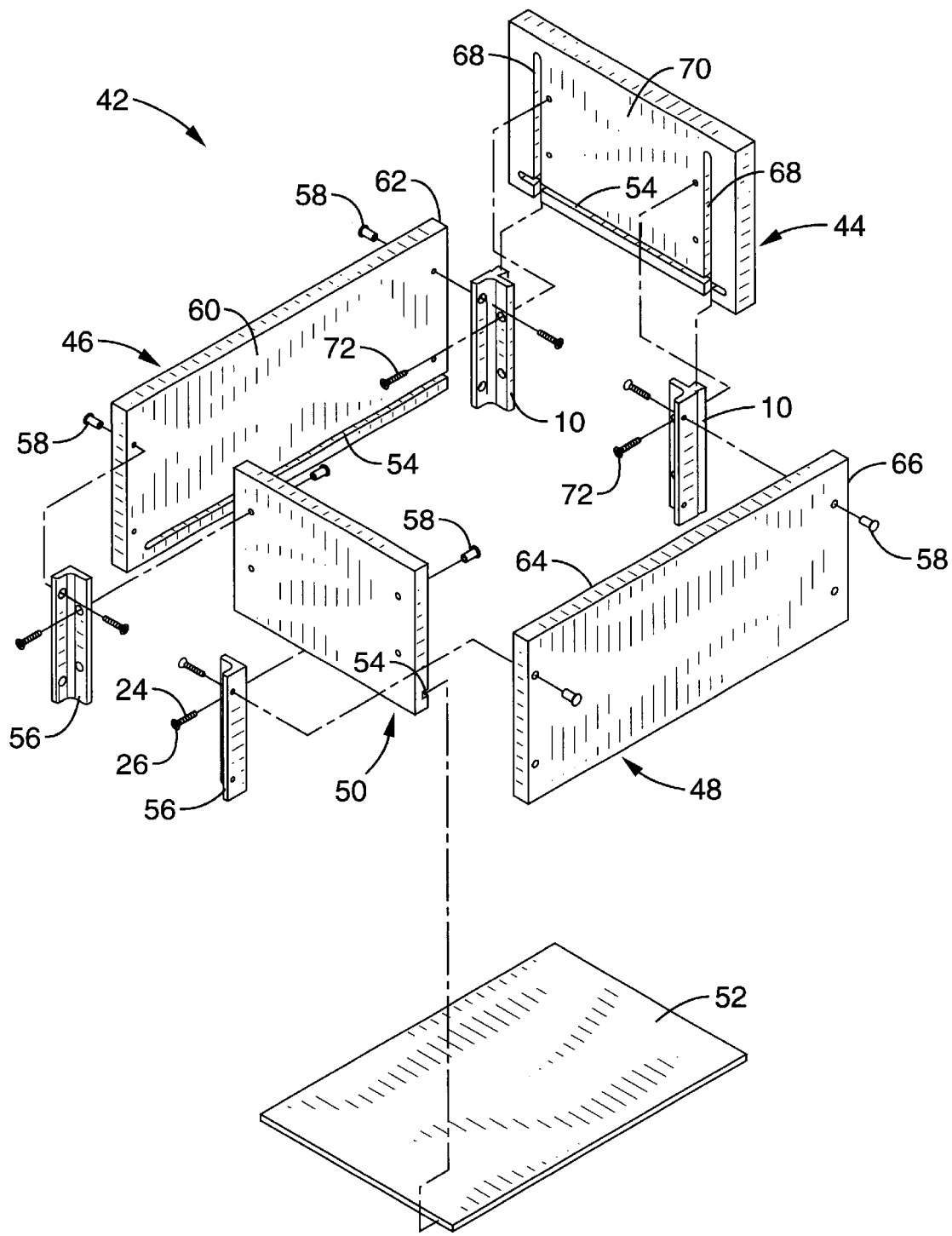
FIG. 3 is an exploded perspective view of a drawer constructed using two of the modular dovetail brackets of the invention to bind the drawer front panel to the front ends of the side panels.

As shown in FIG. 2, tenon 16's first tapered face 32 includes longitudinal slots 38 separated by web 40. The depth of slots 38 is preferably approximately half the thickness of tenon 16.

Each modular dovetail bracket 10 is bilaterally symmetrical with reference to a transverse plane perpendicular to, and bisecting, bracket 10's length.

FIGS. 3 through 6 help illustrate how modular dovetail bracket 10 is used in assembly of a drawer 42. Drawer 42 is comprised of generally standard components, including front panel 44, right side panel 46, left side panel 48, rear panel 50 and bottom panel 52. A dado slot 54 runs around the lower edges of vertically-oriented panels 44, 46, 48 and 50 to receive corresponding edges of bottom panel 52. Panels 44, 46, 48, 50 and 52 are preferably solid wood, laminates or composites. These panels are shipped flat, in kit form, along with two modular dovetail brackets 10; two L-shaped, plastic-molded corner brackets 56; and, an appropriate number of screws 24 and cap nuts 58.

In assembly, first planar flange 12 of a first modular dovetail bracket 10 is fastened to inside face 60 of drawer 42's right side panel 46, adjacent right side panel 46's forward end edge 62. And, first planar flange 12 of a second modular dovetail bracket 10 is fastened to inside face 64 of drawer 42's left side panel 48, adjacent left side panel 48's forward end edge 66. As each modular dovetail bracket 10 is identical, and each is bilaterally symmetrical, one may be used on the left, and one on the right, simply by arranging them in mirror-image fashion. Then, the tenon portion 16 of each modular dovetail bracket 10 is slidingly engaged with a vertically-oriented mortise groove 68 in the inside face 70 of front panel 44. Vertical mortise grooves 68 are disposed near the left and right side ends of front panel 44. Each mortise groove 68 is open at its bottom, and closed at its top.

Bottom panel 52 is slidingly engaged with dado slot 54 in front, right and left panels 44, 46 and 48. This captures tenons 16 in mortise grooves 68. Rear panel 50's dado slot 54 captures the rear edge of bottom panel 52. Then, L-shaped corner brackets 56 are screwed in place, giving drawer 42 structural rigidity. Screws 24 and cap nuts 26 hold all of the foregoing in place. Finally, for extra rigidity and durability, wood screws 72 are used to bind second planar flange 14 of each modular dovetail bracket 10 to inside face 70 of front panel 44, adjacent mortise grooves 68.

Screws 24 and 72 are preferably driven from the interior-angle side of modular bracket 10. Cap nuts 26 preferably have very low profile caps, and are generally engaged with screws 24 from the outside, through pre-drilled holes in panels 44, 46, 48 and 50. Thus, the unskilled user can assemble the furniture elements of the invention, including modular dovetail joint brackets 10, with nothing more than a screwdriver.

Figure 4:
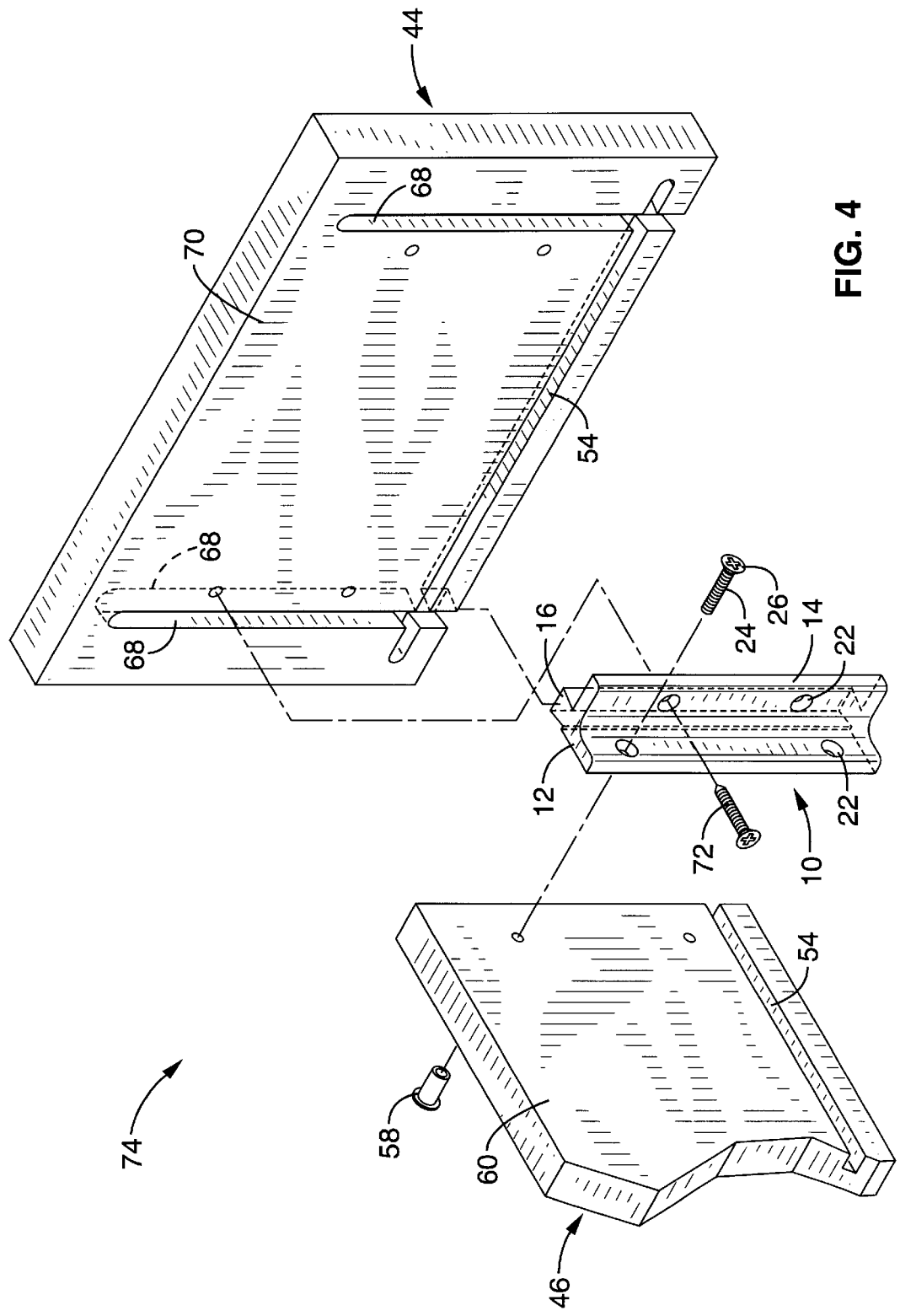
FIG. 4 is an enlarged, exploded perspective view of a left drawer front corner joint showing the manner of use of the modular dovetail bracket of FIG. 1 in that assembly.
Figure 5:
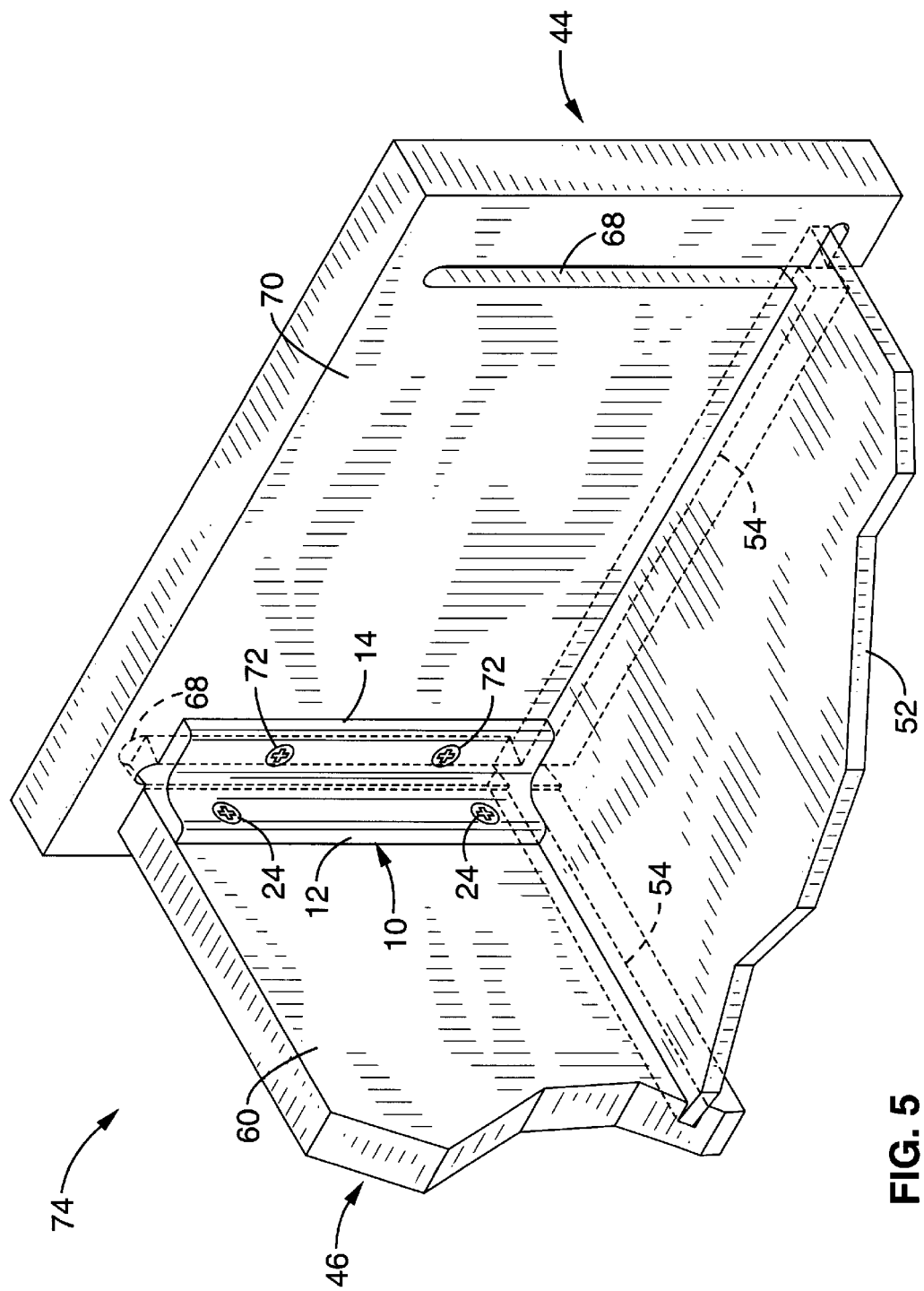
FIG. 5 is a perspective view of the inventive modular dovetail bracket in the front left corner of a drawer.
Figure 6:
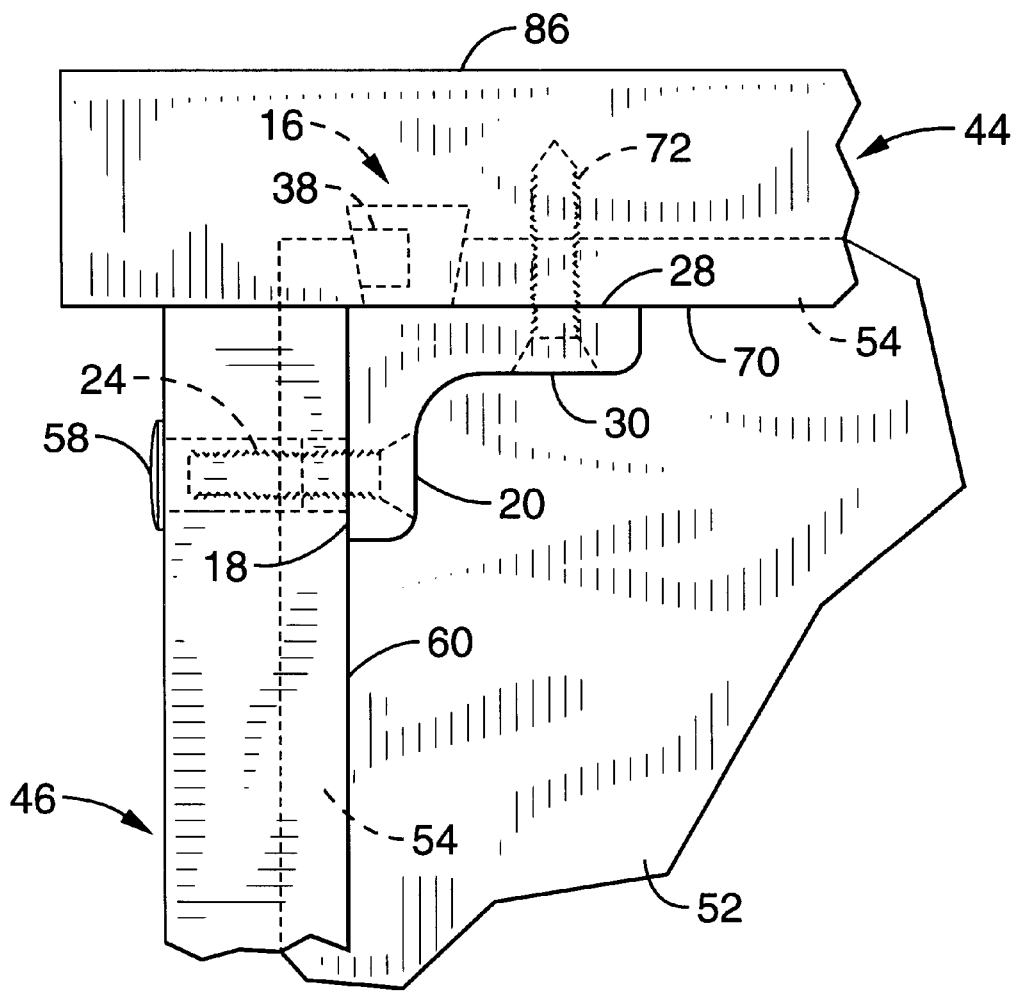
FIG. 6 is an enlarged, fragmentary top plan view showing an assembled front left drawer corner using the modular dovetail bracket of the invention.
Figure 7:
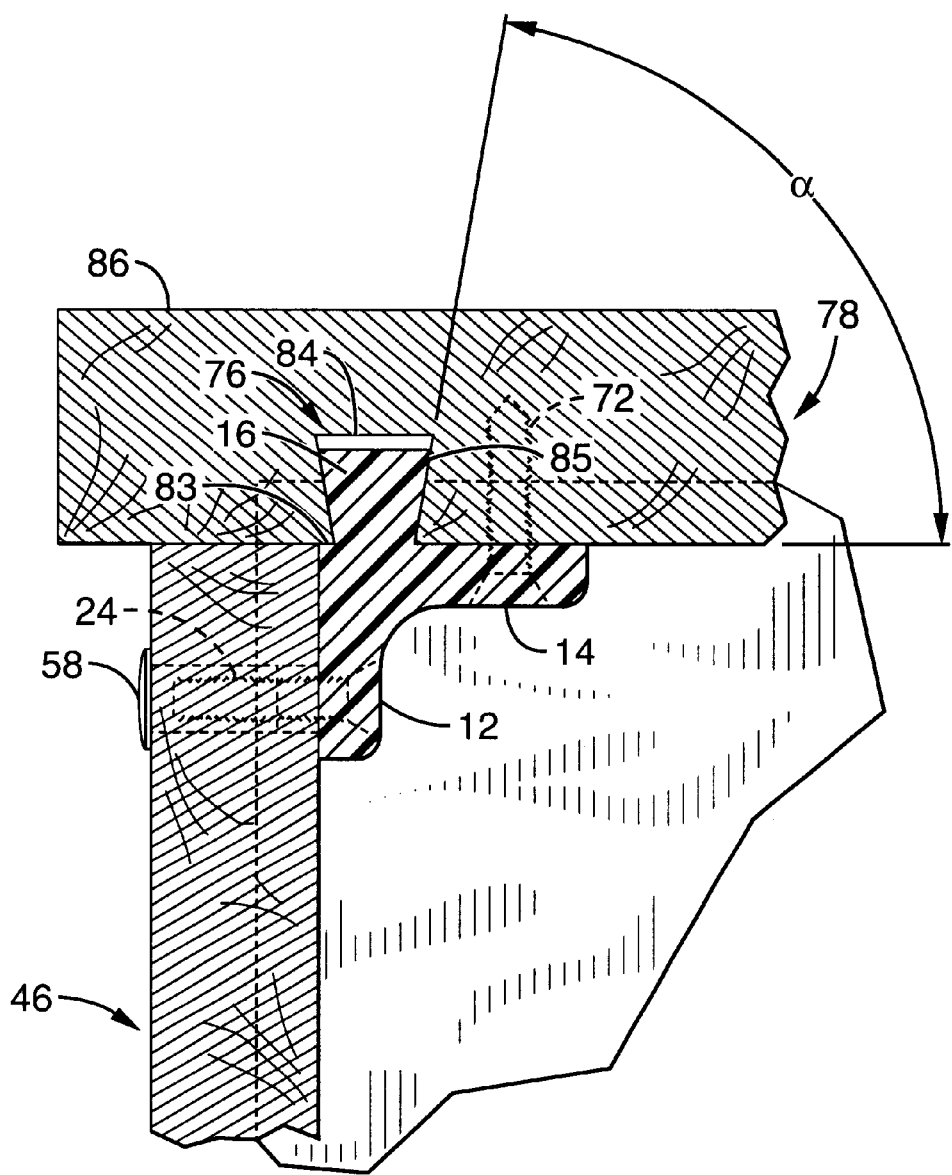
FIG. 7 is a fragmentary cross-section showing the interaction of the modular dovetail bracket of the invention with a deeper than usual mortise groove.
Figure 8:
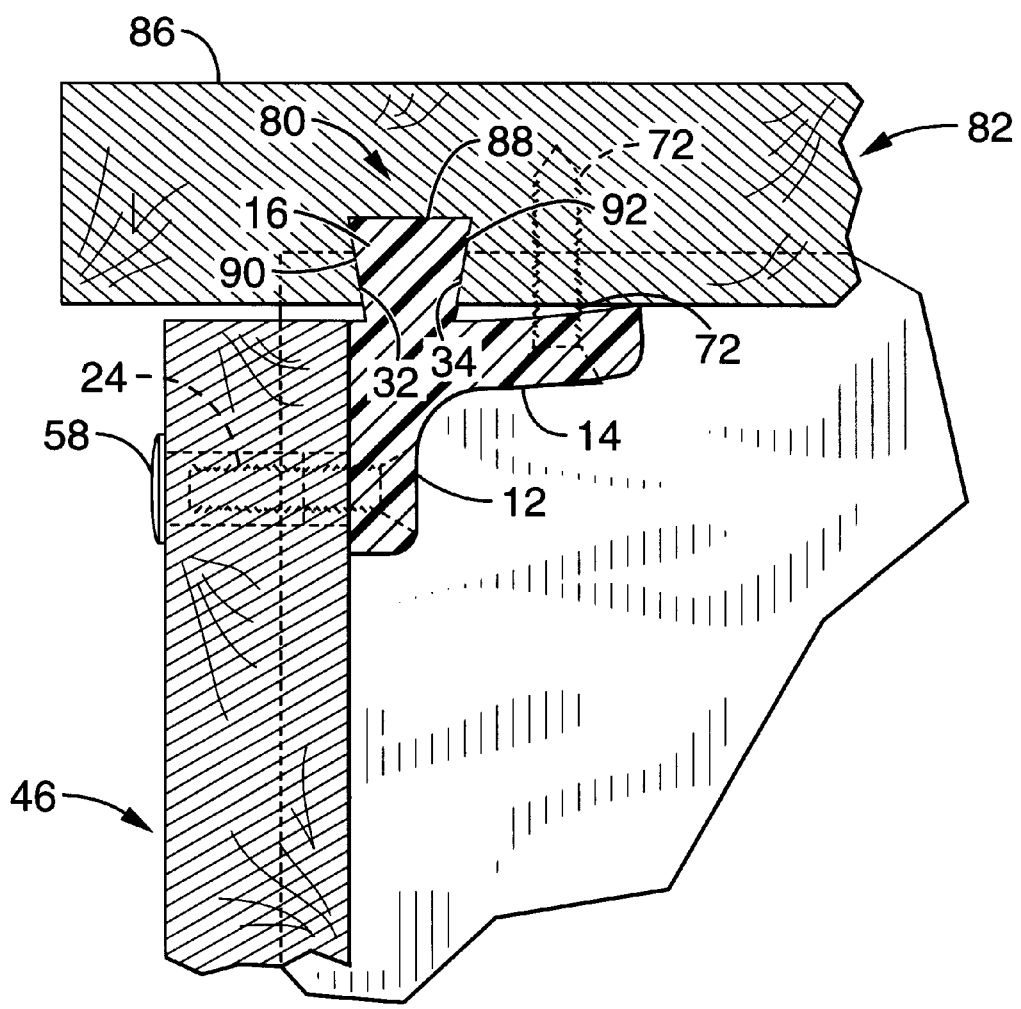
FIG. 8 is a fragmentary cross-section showing the interaction of the modular dovetail bracket of the invention with a shallower than usual mortise groove.

Details of this assembly are best understood from FIGS. 4 and 5, which show drawer 42's right front corner joint 74. FIG. 6 illustrates a perfect fit between tenon 16 and mortise groove 68. However, some modular joint bracket 10's most important benefits are best understood with reference to the cross-sections of FIGS. 7 and 8 which show problems in mortise and tenon fit. FIG. 7 shows a mortise groove 76 deeper than usual resulting from mortising a thicker piece of drawer front panel stock 78. FIG. 8 shows a mortise groove 80 shallower than usual resulting from mortising a thinner piece of drawer front panel stock 82. Whereas in FIG. 7, a conventional dovetail mortise and tenon joint would allow loose to-and-fro play between tenon 16's distal face 36 and overly-deep mortise groove 76's bottom wall 84, second flange 14 limits tenon 16's travel into mortise groove 76, thus resulting in a tight, secure joint. Additionally, lateral flange 83 further limits travel of tenon into mortise groove 76. Wood screws 72 through second flange 14 into front panel 78 strengthen that connection, and help limit travel in lateral directions, as well. Most particularly, the roughly 80-degree angle "α" between second panel-contacting face 28 and tenon 16's second tapered face 34 can be very precisely controlled in manufacturing modular dovetail bracket 10. As long as the mortise groove is cut with angles matching that of the tenon—no matter the mortise groove's depth—a very secure fit against a complementary 80-degree angle between front panel 78's inside face and mortise groove 76's tapered interior surface 85 can be achieved. Further, this effectively allows a switch from using a front panel's outer face, e.g. 86, as a reference surface, as it was in cutting the mortise groove, to using a panel's inside face as the reference surface for controlling mortise and tenon fit.

In contrast, as shown in FIG. 8, engaging modular dovetail bracket 10 with shallow mortise groove 80 can still result in a secure joint, but in a different way. Although tenon 16's distal face 36 abuts mortise groove 80's bottom wall 88, tenon 16's first and second tapered faces 32 and 34 are securely grasped by shallow mortise groove 80's first and second tapered interior surfaces 90 and 92. Thus, this is simply a secure dovetail joint. And, wood screws 72 through second flange 14 into front panel 82 strengthen that connection.

FIG. 8 shows, with great exaggeration just to illustrate the principle, that in this case there will be a gap between panel-contacting face 28 and panel 44's inside face 70. However, as second flange 14 is preferably manufactured to be very slightly flexible, wood screws 24 will press second flange 14 toward inside face 70. This will further secure against to-and-fro movement, and against lateral movement, as well.

Slots 38 in tenon 16's first tapered face 32 serve several beneficial purposes. One is in making tenon 16 slightly more flexible and somewhat compressible, and therefore easier to slide into a closely-machined mortise groove. Another is in reducing some friction-causing surface area along tapered face 32, further reducing the effort it takes the end-user to assemble the modular joint. Yet other benefits are in manufacturing. Slots 38 reduce the amount of plastic material needed in molding modular dovetail bracket 10. And, they also allow the mold to fill faster, thus heating the material more efficiently, and resulting in a more uniform product. Finally, slots 38 permit cooling air to circulate better around bracket 10, reducing problems arising from uneven cooling.

Figure 9:
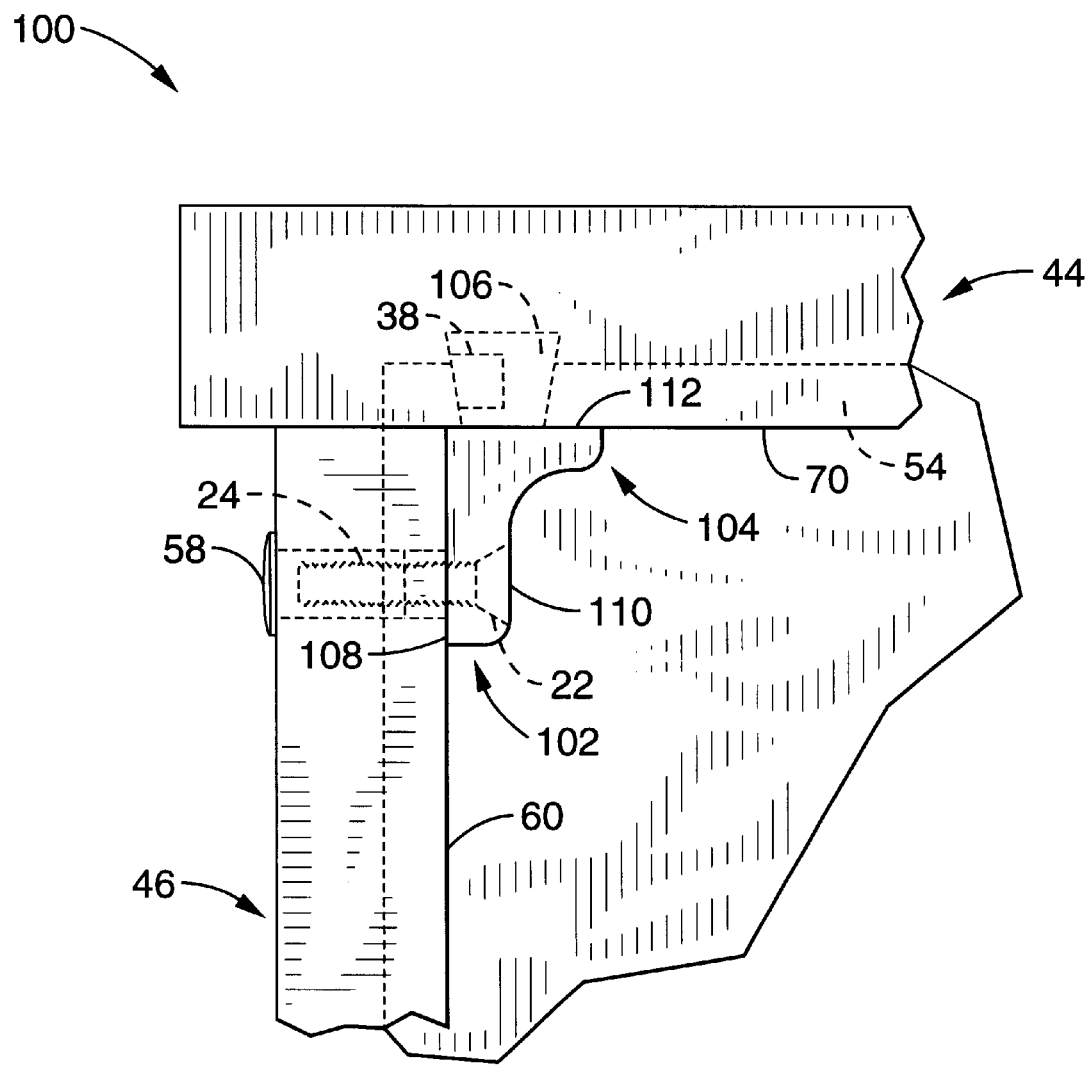
FIG. 9 is an end elevation of an alternative, short-flanged embodiment of the modular dovetail bracket of the invention.

An alternative embodiment of the modular dovetail bracket of the invention, generally identified herein with reference numeral 100, is shown in FIG. 9. Modular dovetail bracket 100 includes a planar first flange 102; a truncated second flange 104 at right-angles to first flange 102; and, a dovetail-shaped tenon 106 projecting from adjacent the outer apex of flanges 102 and 104.

First flange 102 includes a panel-contacting face 108 and a fastener head-receiving face 110. Truncated second flange 104 has a very small panel-contacting face 112, and no means for being independently fastened to an inside face 70 of a front drawer panel 44. First tapered panel of tenon 106 includes slots 38.

Alternative bracket 100 works essentially as that of the first embodiment in preventing its tenon 108 from wobbling to-and-fro in deeper mortise grooves. And, in proper-depth and shallower grooves, engagement is as secure as a conventional mortise and tenon. However, alternative bracket 100 lacks the additional reinforcement of the screws able to be received by bracket 10. This truncated second flange 104 may nevertheless be desirable for aesthetic reasons, or to limit bracket hardware projecting into a drawer's interior space.

The foregoing detailed disclosure of the inventive modular dovetail bracket is considered as only illustrative of the preferred embodiment of, and not a limitation upon the scope of, the invention. Those skilled in the art will envision many other possible variations of the structure disclosed herein that nevertheless fall within the scope of the following claims.

And, alternative uses for this inventive bracket may later be realized. Accordingly, the scope of the invention should be determined with reference to the appended claims, and not by the examples which have herein been given.

I claim:

1. A furniture joint bracket, comprising:

a. a first furniture panel-engaging portion;

b. a second furniture panel engaging-portion integral with said first furniture panel-engaging portion;

c. a flexible and compressible tenon having a first tapered face, said face having slots therein;

d. said tenon being integral with said second furniture panel-engaging portion and adapted to project into a mortise groove imparted into a furniture panel; and e. said tenon projecting in a direction parallel to, but slightly offset from, said first furniture panel engaging portion.

* * * * *